July 28, 1925.

J. B. WHITMORE ET AL 1,547,479

CANE AND TUBE GAUGING MACHINE

Filed April 30, 1921

INVENTORS
JAMES B. WHITMORE
JOHN E. FERGUSON
BY
*J. F. Erbert*
ATTORNEY

July 28, 1925.

J. B. WHITMORE ET AL 1,547,479

CANE AND TUBE GAUGING MACHINE

Filed April 30, 1921     4 Sheets-Sheet 4

INVENTORS
JAMES B. WHITMORE
JOHN E. FERGUSON
BY
*J. F. Ebert*
ATTORNEY

Patented July 28, 1925.

1,547,479

UNITED STATES PATENT OFFICE.

JAMES BRYANT WHITMORE AND JOHN EBLING FERGUSON, OF BLOOMFIELD, NEW JERSEY, ASSIGNORS TO WESTINGHOUSE LAMP COMPANY, A CORPORATION OF PENNSYLVANIA.

CANE AND TUBE GAUGING MACHINE.

Application filed April 30, 1921. Serial No. 465,821.

*To all whom it may concern:*

Be it known that we, JAMES BRYANT WHITMORE, a citizen of the United States, and a resident of Bloomfield, in the county of Essex and State of New Jersey, and JOHN EBLING FERGUSON, a citizen of the United States, and a resident of Bloomfield, in the county of Essex and State of New Jersey, have invented a new and useful Improvement in Cane and Tube Gauging Machines, of which the following is a specification.

Our invention relates to a mechanism for gauging and segregating articles, and, more particularly, it has special reference to a mechanism for automatically gauging fragile articles such as cane or tubing of glass or other like material.

An object of our invention is to provide a machine for expeditiously and efficiently gauging a number of articles by automatically passing them through the machine and distributing the gauged articles to predetermined containers.

Another object of our invention is to provide a machine for automatically transporting glass cane or tubing to a gauging or measuring device and moving the cane or tubing progressively over a series of gauges and collecting gauged cane or tubing into separate lots.

A still further object of the invention is to provide, in the gauging machine, a guiding means for receiving and arranging the articles in definite relationship with reference to each other and the gauging devices, for the purpose of passing the articles to the gauging means in a definite manner.

These and other objects will be apparent from the following detailed description.

The present practice of gauging glass cane or tubing, so far as we are informed, is a manual operation wherein an operative is supplied with sets of gauge jaws or points of successively increasing sizes ranging between predetermined limits. The worker tries out all the cane or tubing progressively in the different gauge jaws or points, beginning with the gauge of smallest diameter. Obviously, this procedure is tedious and time consuming. Furthermore, unless considerable care is exercised, cane or tubing of a certain size will not be tested in the gauge of the corresponding size but will be tested in a gauge of larger size. This results in cane or tubing of different size being confused.

To avoid the above objections and to reduce the number of operatives in order to effect a given output, a mechanism which will automatically and accurately gauge any number of canes or tubing is desirable. In order to accomplish this end, we have provided a mechanism for orderly arranging cane or tubing and feeding them, progressively through a series of gauges. The cane or tubing passing through the gauges are automatically discharged and collected in separate piles. Those not passing through any of the gauges are also collected, after the gauging operation, by passing them through a gauge considerably larger than any gauges of the series.

A selected embodiment of the invention is illustrated in the accompanying drawings in which.

A machine for gauging cane or tubing may consist of a conveying means for advancing, in succession, the cane or tubing to a series of sets of gauge jaws or points arranged in line and of successively increasing sizes; of means for progressively advancing the cane or tubing through the series of gauges; and of means for discharging and distributing the gauged cane or tubing.

Hereafter, whenever cane or canes are referred to, it is to be understood that tubing may just as well be used, as it is obvious that the apparatus will operate as well with one as with the other.

Referring to Figs. 1 to 4, inclusive, standards 8 connected by crossbeams 9 form a main frame for the horizontal table 10 upon which the gauging devices, later to be described, are mounted. Extending outwardly from the main frame are two auxiliary frames 11 and 12, (Fig. 2) which furnish support for the cane-feeding mechanism and for the removable containers for receiving the gauged cane, respectively.

A form of feeding and arranging mechanism for advancing cane to the sets of gauge jaws or points preferably comprises two downwardly inclined supports or brackets 13, (Figs. 2 and 3) chain conveyors 14 extending rearwardly therefrom and a second conveyor 15 adjacent the rear or discharge ends of the conveyors 14. The two supports or brackets 13 may be secured in any desired manner to the frame 11 and each may be provided with a short horizontal ledge 16, at is lower end, upon which canes are received in succession from the higher portions of the supports.

Figure 6:
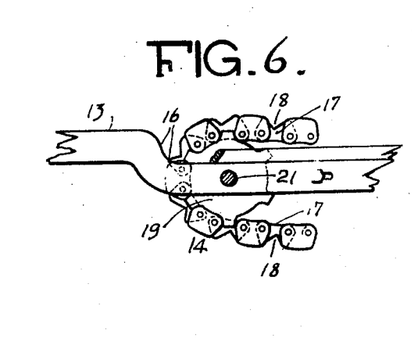
Fig. 6 an enlarged sectional detail view on line VI—VI, of the receiving end of the feeding conveyor.
Figure 7:
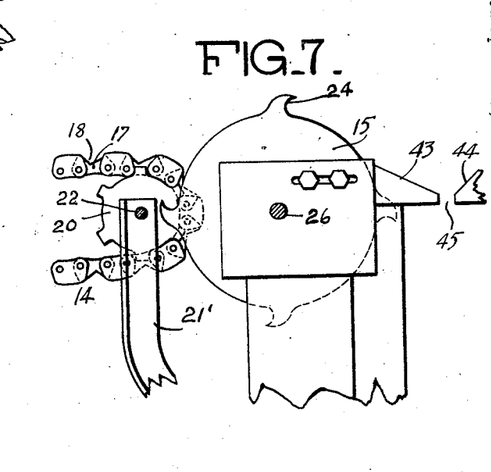
Fig. 7 an enlarged sectional detail view on line VII—VII, Fig. 2 illustrating the discharge end of the feeding conveyor and a second conveyor.

The conveyors 14 are of the sprocket-chain type having single links 17 with notches 18 (Figs. 6 and 7) in their upper edges. These conveyors are threaded on pairs of sprocket wheels 19 and 20, (Fig. 2) the former pair of said wheels being secured, in any desired manner, to a shaft 21, mounted to freely rotate in runners 23 secured to the frame 11, and the wheels 20 on a shaft 22 supported in brackets 21 mounted on the table 10. The runners 23 support the upper stretch of the sprocket chains and prevent them from sagging. The notched links cooperate with the horizontal section of the supports, (Fig. 6) to remove the work in succession therefrom and maintain it in parallelism while being transported to the gauging devices.

For removing the cane or tubing in succession from the conveyors, 14, a second conveyor 15 may be provided. This conveyor may be in the form of two disks having hook-shaped teeth 24 (Fig. 7) for successively engaging and carrying the canes as they are moved into position by the conveyors 14. To prevent the cane from being broken between the two conveyors, the disks may be made to overlap the ends of the conveyors 14 (Fig. 7) to such an extent that the curved surfaces of the disks between the teeth 24 will cam or roll a cane out of the notch 18. Such action is enhanced by making the forward inclined face of the notches 18 very abrupt. Ordinarily, where the diameters of the canes do not vary greatly, the movement of the parts is such that the teeth 24 are in engaging position just as a cane is brought forward by the conveyors 14. But, when a cane of large size is moved on the conveyor, it is obvious that it will project farther to each side of the apex of the notch 18 than a smaller one would, and, therefore, will reach the face of the disks 15 before the teeth 24 are in position to engage the cane. Without some means such as described, the cane would be crushed between the two conveyors before the teeth 24 reached the engaging position.

After removal from the conveyor 14, the canes are lifted by the toothed disks to a position substantially vertically above the shaft 26 (Fig. 3) from whence they may fall under the action of the potential energy they possess, due to their position, into the gauging devices which will be hereinafter described.

In feeding the cane, it may be desirable, at times, to manually position the cane directly in the first set of gauge jaws or points or it may be preferable to place them by hand on the chain conveyors or the teeth of the conveyor disks. In placing them on the chain conveyors, the operator may either position them, one at a time, in the notches as they appear at the feed-in end, or else wait until either the entire or part of the upper strands of the chain conveyors are empty and then distribute the cane in the notches beginning nearest the conveying disks. Or, if desirable, the cane may be guided, in any well known manner, to the sets of the gauge jaws or points.

The gauging device selected for illustrative purposes comprises a plate 27 (Fig. 3) mounted adjacent to one edge of the table 10. The plate 27 has a series of vertical slots 28 to 32, each slot being wide enough to accommodate any gauged cane or tube which may pass through its set of gauge jaws or points. Secured in any desired manner to the plate 27 adjacent the open end of the slots and forming the gauges or gauging apertures proper, are pairs or sets of gauge jaws or points (hereinafter referred to for the sake of convenience as jaws or a pair of jaws and will as a whole be designated as a gauging member) 33—34, 35—36, 37—38, 39—40, 41—42, one set being provided for each slot. The jaws 33, 35, 37, 39 and 41 may be adjustably secured to the plate 27 while the jaws making up the other members of the sets may be fixedly secured, in any desired manner, to the plate 27. Each of the adjustable jaws 33, 35, etc., has an inclined face 43 and the opposing fixed jaw has a sharper inclined face 44. These faces form hopper-like guides for directing cane deposited therein to the vertical gauging faces 45. A considerable range in sizes may be obtained by adjusting the jaws 33, 35, etc. toward or from the fixed jaws 34, 36, etc.

The jaws are positioned approximately in the same horizontal plane as the upper stretch of the chain conveyors 14, but slightly to one side thereof, and extend in the same general direction as these conveyors. Thus, it will be seen the canes are fed and gauged in approximately the same plane.

A supporting plate 46, (Fig. 2) having notches 47 in its upper edge, is suitably mounted intermediate the edges of the table 10 and parallel to the plate 27. The notches are in horizontal alignment with the jaws so that a series of canes resting in said jaws and the aligned notches will be in substantial parallelism.

In order to effect a progressive movement of the articles not gauged by any set of jaws to other jaws, automatic mechanism may be provided. A mechanism for this purpose may comprise means for moving or pushing a cane not gauged by a set of jaws to another set. It may be desirable to have the cane roll or tumble into the next set of jaws after having been partly moved toward them. A means for accomplishing these desired ends may comprise a plurality of conveyors or pusher fingers 53 to 60 inclusive, secured in any desired manner to a series of parallel shafts 49 to 52, inclusive, which are mounted for rotation in plates 27 and 46 and a plate 48 mounted adjacent an edge of the table 10. Certain of these fingers, such as 53, 55, 57 and 59, may be positioned adjacent the plate 27, while others, such as 54, 56, 58 and 60, may lie adjacent the plate 46. This arrangement provides for the moving force being exerted at the point where most needed, i.e., at the places where the cane is supported. To assist the other pusher fingers, other fingers 61 to 64, inclusive, may be mounted on the shafts 49 to 52, preferably midway between the plates 46 and 48.

As mentioned heretofore, the jaws 33, 35, etc., are adjustable. It is obvious, therefore, that, in making an adjustment in these jaws, their positions with respect to the ends of the pusher fingers 53, 55, 57 and 59 are altered, and it is possible this might prevent a cane from being guided into the next set of jaws, due to the pusher leaving the cane before it reaches the inclined face 43. By making the faces 43 with longer slopes this objection may be obviated, so that, regardless of any adjustment in the jaws 33, 35, 37, 39 or 41, the cane will be moved to the inclined faces 43 by the pusher fingers, and thereafter, under the action of potential energy, tumble or roll down each face to the vertical gauging face 45. It will thus be seen that the inherent potential force of the cane, in addition to positively acting mechanical means, may be used to assist in transferring the cane progressively through the machine.

It is desirable to present different faces on the peripheries of the cane to the jaws so that, if a cane is slightly out-of-round, its minimum diameter will be presented to the gauge, and the cane afforded an opportunity of passing through. A way of causing such action to take place is to cause the cane to drop or tumble into the jaws as heretofore pointed out.

The sets of jaws may be arranged with the set of the smallest size nearer the feeding device, with the remaining sets usually arranged progressively increasing in size. The last set of the series is generally considerably larger in size than any preceding set in order to permit passage therethrough of any stray canes or tubes of a size considerably larger than any gauge of the series. This oversized set of jaws is usually termed the "carry-over." It is not desired to be restricted to the number of jaws or arrangement thereof illustrated, but consider any other number or arrangement which accomplishes the same purpose as falling within the scope of the invention.

Secured to the table between the plates 27 and 48, and beneath the shafts 49 and 52 incl. is a downwardly inclined guide plate 66 having its lower edge adjacent the plate 27. This plate operates to guide the ends of canes remote from the gauges into suitable receiving containers 68.

The mechanism for discharging the gauged cane or tubing preferably includes guide plate 66 and high-speed conveyor 67 rotatably supported in any convenient manner, as by brackets. A roller has been selected for illustrating a preferred type of conveyor. This roller is usually arranged adjacent and parallel to that edge of the table upon which the gauge plate 27 is positioned. The roller may be rotated at high speed in the direction of the arrow, Fig. 5 so that gauged cane passing through the gauges may be quickly removed in order to prevent interference with the following cane. When a cane of proper size for a set of jaws is moved into the set, it will drop through into the slot beneath it and upon the rapidly rotating conveyor 67. Thus, the cane is tilted and discharged in a different plane from that in which it was gauged.

In order to effect the discharge of the cane after gauging, it is to be understood that other equivalent arrangements may be resorted to.

To ease the shock of the cane caused by its fall after passing through the gauges, some shock-absorbing means should preferably be provided. A desirable means is a cover for the roller of a suitable resilient shock-absorbing material. The material may have a frictional surface to better engage the cane. It has been found that rubber satisfies all the requirements but it will be understood that any other material which accomplishes the same purposes may be employed.

Figure 4:
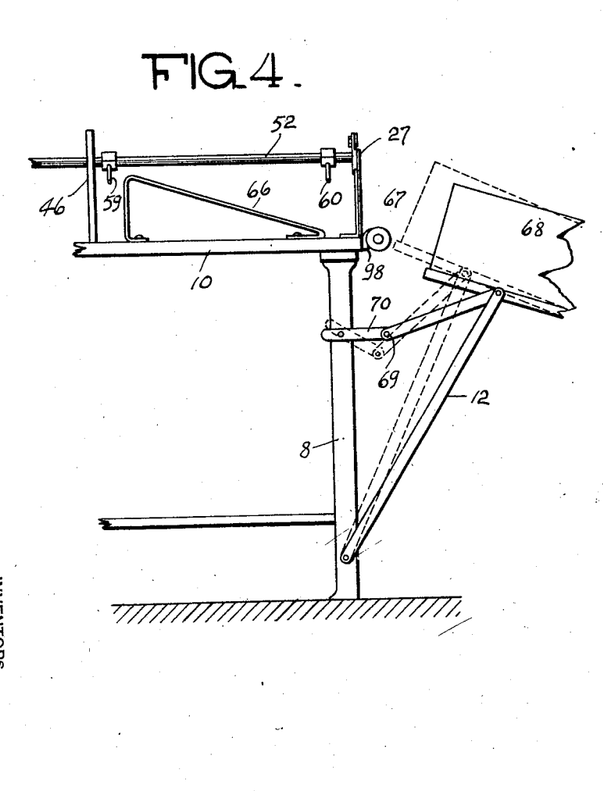
Fig. 4, an end elevation of the discharging end of the machine.

The discharged cane may be received in removable containers 68 mounted on the adjustable frame 12 (Fig. 4). Preferably, these containers have the ends nearest the roller 67 notched. The frame 12 may be adjusted to the dotted-line position by loosening the clamping nut 69 of the toggle links 70. By means of such adjustment, the boxes may be brought nearer the roller 67 so that short cane will pass conveniently into them.

Figure 1:
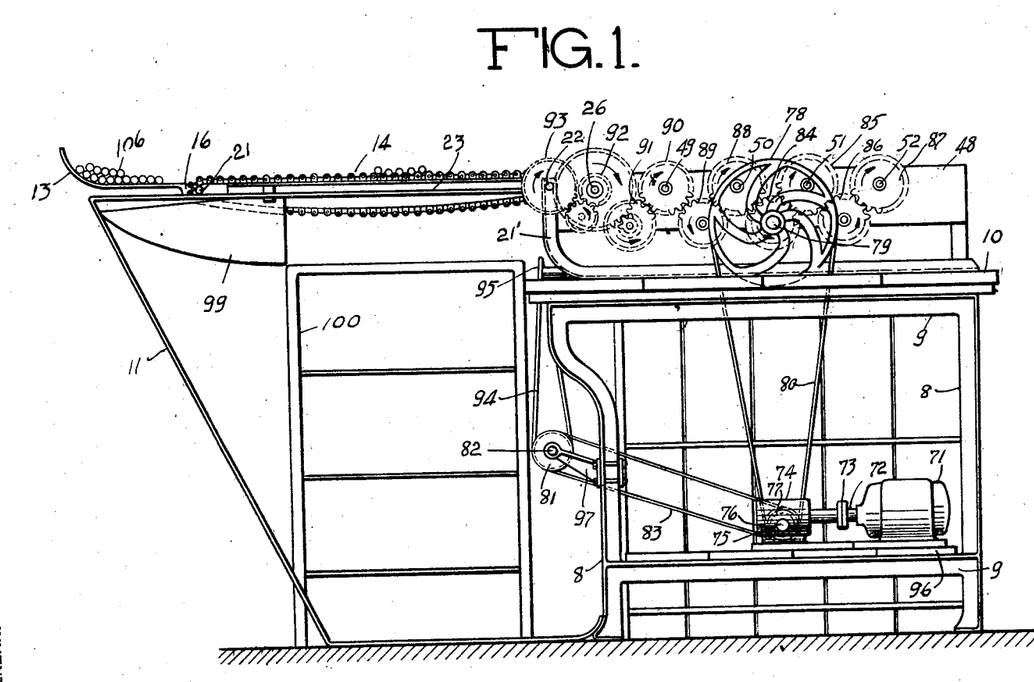
Fig. 1, is a side elevation of a cane or tube gauging machine.
Figure 2:
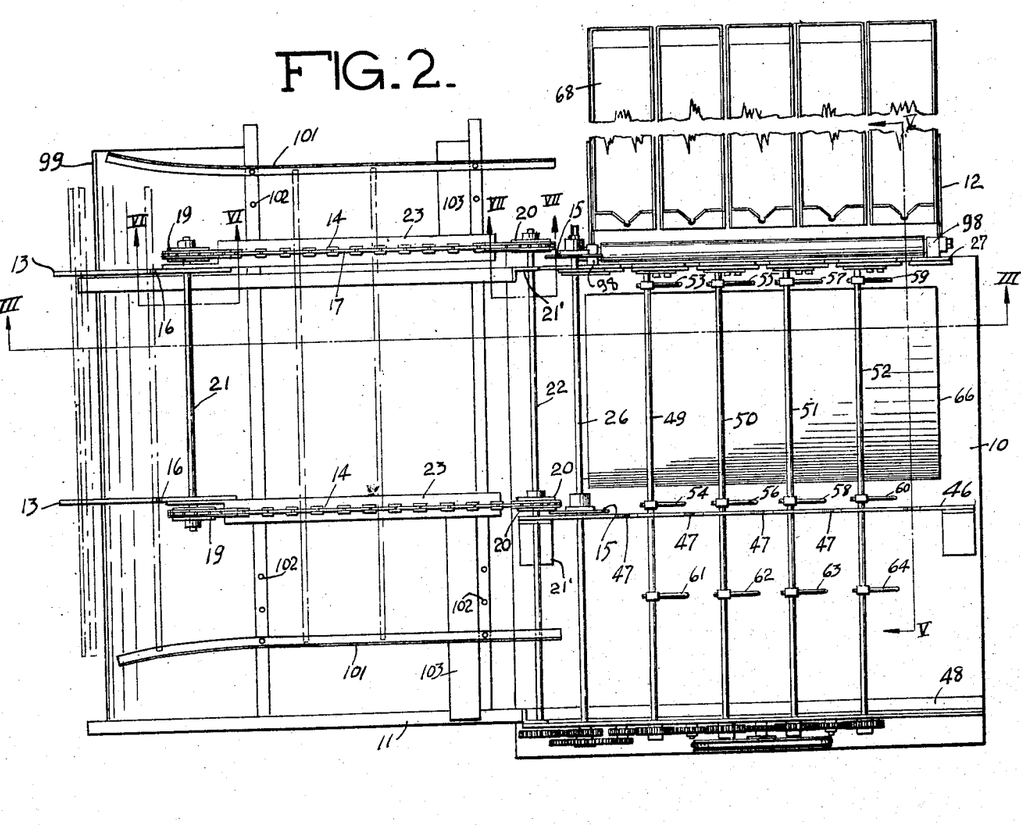
Fig. 2, a plan view showing the general arrangement of the feeding mechanism, the gauging devices and the discharging and collection mechanism.
Figures 3, 5:
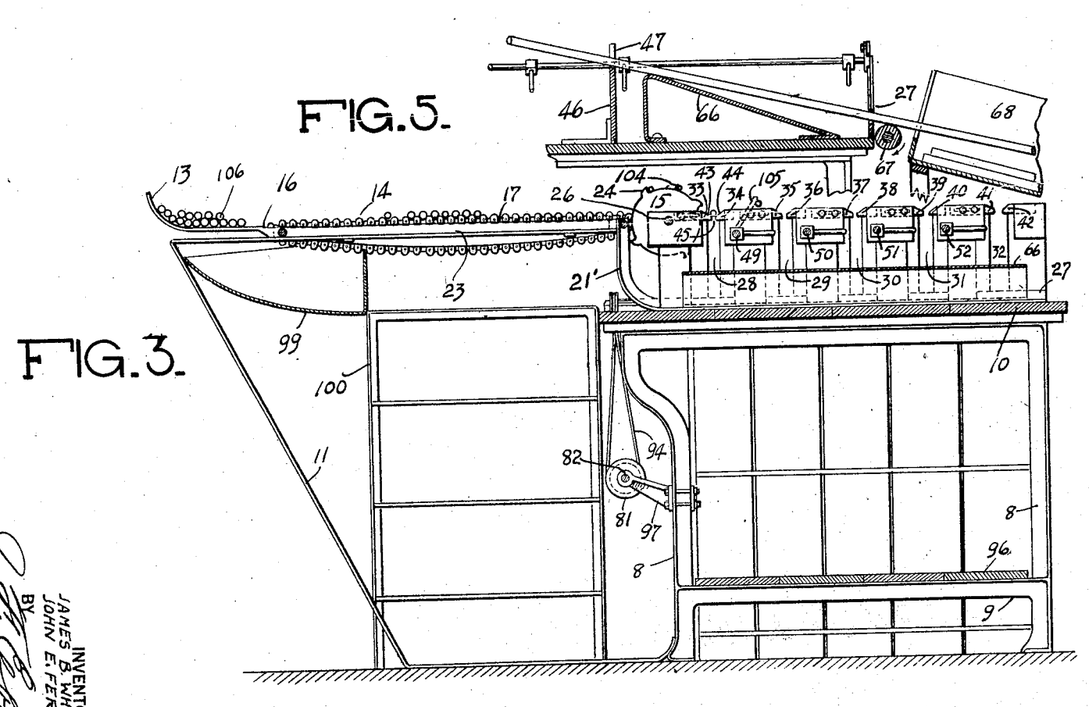
Fig. 3, a sectional view on the line III—III of Fig. 2, illustrating, in greater detail, the feeding mechanism and the gauging devices.
Fig. 5, a vertical section on line V—V of Fig. 2, showing cane or tubing about to be discharged from the gauging devices.

Motion may be imparted to the various parts of the machine by an electric motor 71 (Fig. 1) through shaft 72, coupling 73, and standard reduction gear 74. Connected to the shaft 75 of the gear 74 are two pulleys 76 and 77, the former driving pulley 78, mounted on stub shaft 79, through a belt 80, and the latter operating pulley 81 mounted on the shaft 82, through belt 83. Motion in clockwise direction, Fig. 1, is imparted to the shafts 22, 26, 49, 50, 51 and 52 through the train of gears 84 to 93, inclusive supported in part on said shafts and in part on stub shafts in the plate 48, the high-speed roller 67 being operated by means of crossed belt 94 and pulley 95 from the shaft 82. The conveyors 14, conveying disks 15 and pusher conveyors 53, etc., are preferably operated in synchronism.

The electric motor 71 and reduction gear 74 are mounted on a table 96 supported by cross beams 9, while the shaft 82 and roller conveyor 67, respectively, are rotatably supported in brackets 97 and 98, suitably attached to the main frame 8.

Beneath the supports 13 and the forward portion of the chain conveyors 14 is a receptacle 99, supported in the frame 11, for receiving broken canes. A rack 100, for receiving empty containers 68, is suitably positioned beneath the conveyors 14.

In gauging cane, it is frequently desirable to gauge them at a specific distance from their ends. Therefore, it is necessary to properly align the cane with respect to the jaws. This may be accomplished by properly placing the cane in the first instance, but it may be preferable to have aligning means which automatically performs such operation. One form of such means may comprise flared guide plates 101 (Fig. 2) extending parallel to the conveyors 14. In order that the position of the guide plates may be altered to accommodate cane of different length or to change the gauging position, several openings 102 are provided in the frame 11 by which the plates may be secured at different distances apart or changed with respect to the sets of jaws. It also may be desirable to provide guiding means for the ends of the canes to prevent their engagement with shafts 22, 26, etc. A convenient manner of avoiding such difficulty is to secure horizontal plates 103 to the frame 11 beneath the discharge end of the conveyor 14.

The operation of the foregoing apparatus may be described as follows: Cane or tubing 106 (Fig. 1) are placed on the inclined surface of the supports 13 and, under the action of gravity, are moved, one after another, onto the horizontal sections 16 of these supports. The cane resting on these sections are successively engaged by the notched links 17 and carried rearwardly to the conveying disks 15. While moving rearwardly on the conveyors 14, the ends of the cane are engaged by the flared guides 101 to properly align them with the gauging mechanism. As each cane reaches the end of the conveyor 14, it is engaged by the teeth 24 of the conveyor disks 15 and raised to approximately the dotted-line position indicated at 104 in Fig. 3, whereupon, under the action of its potential energy due to its position, it tumbles or falls into the first set of jaws of the series.

The tumbling of the cane causes it to rotate, whereby different faces are presented to the jaws so that it may pass through at its point of minimum diameter. The position of the fingers 53, etc., at this time, are indicated in dotted outline at 105 in Fig. 3. Should the cane pass through the gauge, it will fall on the guide 65 and conveyor 67 and be rapidly removed from the machine. The fingers 53, etc., are rotated at such speed as to permit the removal of the cane from the machine before engagement thereby. Should the cane fail to pass through the first set of jaws, it will be engaged by the lifting fingers on the shaft 49 and pushed or moved out of that set of jaws and into the next set, the fingers disengaging the cane when the latter are in position to permit the potential energy stored therein to carry them, with a tumbling motion, into the next set of jaws. This action is continued as long as the canes are not gauged or until the "carry-over" set of jaws is reached, whereupon, all the remaining canes not gauged are discharged from the machine. The cane removed by the high-speed roller, 67 are distributed in removable containers 68 which, when full, are taken from the support 12 and empty ones substituted therefor.

Obviously a gauging machine of the character set forth can readily be coordinated or connected with standard cane and tube drawing apparatus, so that either after or during the process of drawing the cane or tubing may be gauged.

It is to be understood that the specific feeding means, or gauging means for the cane or tubing, or the means for removing the cane or tubing therefrom are merely illustrative, as many other modifications may be substituted which will operate in substantially the same way and perform substantially the same functions, and the right is specially reserved to consider such modifications as function similarly, as falling within the scope of the invention as defined by the following claims.

What is claimed is:

1. In a gauging machine, the combination of a plurality of gauging members, rotatable fingers independent of said gauging members, means for feeding cane individually to said fingers, means for operating said fingers for the transportation of cane from one of said gauging members to another and means for discharging cane endwise from said machine.

2. In a gauging machine, the combination of a plurality of gauging members, rotatable fingers independent of said gauging members for transporting cane from one of said gauges to another, means for positively discharging each gauged cane endwise from said machine.

3. In a gauging machine, the combination of a plurality of gauges, pusher fingers disposed in an operative relation to each of said gauges for transporting cane from one gauge to another, means for feeding cane individually to said pusher fingers and means for discharging said cane endwise from the machine.

4. In a gauging machine the combination of a plurality of gauging members disposed in a horizontal plane, a conveyor for feeding cane individually positioned adjacent said gauges, pusher fingers for receiving cane from said conveyor and applying the cane successively to said gauges and means for discharging cane endwise from the machine.

5. In a gauging machine, the combination of feeding means including an endless conveyor, a second conveyor positioned adjacent the discharge end of said first conveyor, gauging means, the second conveyor cooperating with the first conveyor to transport articles therefrom to the gauging means, and means for frictionally engaging said articles to discharge them endwise from the machine.

6. In a gauging machine, the combination with means for feeding articles individually including a support for said articles, rotatable fingers positioned in operative relation to said article feeding means to receive articles successively and in substantial parallelism, means for gauging said articles and means for discharging gauged and ungauged articles endwise from the machine.

7. In a gauging machine, the combination of means for feeding articles including a support for said articles, a conveyor cooperating therewith, a second conveyor cooperating with said first conveyor, a plurality of gauging members, means independent of said members for receiving articles from said conveyor, and means for discharging said gauged articles.

8. In a gauging machine, the combination of a plurality of gauging members, means for feeding articles including a conveyor, a second conveyor cooperating therewith, means for obviating breakage of articles passing from said first conveyor to said second conveyor, means independent of said members for applying articles thereto and means for discharging said gauged articles.

9. In a gauging machine, the combination of a plurality of gauging jaws, means for feeding articles including a support for said articles, a conveyor cooperating therewith, a second conveyor comprising an apron adapted to move in timed relation with said first conveyor to remove articles therefrom in succession, means independent of said jaws for applying articles thereto and means for discharging said gauged articles.

10. In a cane gauging machine, the combination of means for feeding cane, a series of sets of gauging jaws of successively increasing sizes disposed adjacent to said feeding means, the last set of said series being considerably larger than the preceding set, means independent of said jaws for applying cane thereto and means for positively discharging cane in the direction of their longitudinal axes.

11. In a cane gauging machine, the combination of means for feeding cane, a plurality of gauging members and means, including a rotary member disposed in operative relation to all said gauging members for discharging said gauged cane.

12. In a cane gauging machine, the combination of means for feeding cane, means for gauging said cane and means, including a shock-absorbing conveyor, for discharging said gauged cane in the direction of their longitudinal axes.

13. A cane gauging machine having a plurality of gauging jaws, means for arranging cane in successive order, means for successively applying cane to said jaws and means common to all said gauges for positively effecting the simultaneous discharge of a plurality of cane endwise from said machine after passage between said jaws.

14. A rod gauging machine, having a conveyor comprising a roller so disposed with relation to said machine as to discharge all gauged rods endwise in a direction substantially at right angles to the longitudinal axis of the machine.

15. A rod gauging machine having a plurality of sets of gauge-jaws, means for progressively applying rods to said sets of jaws for passage therethrough, a rotary member common to all said jaws adapted to frictionally engage said rods after passage between said jaws to remove rods of different diameters and means for collecting rods of like diameter in separate groups.

16. A gauging machine comprising a plurality of sets of gauging jaws, means independent of said jaws for successively applying articles to be gauged to said jaws, means for discharging all gauged articles in the direction of their longitudinal axes from the machine and means for collecting said articles in separate groups.

17. A cane gauging machine having a plurality of stationary sets of gauging jaws, rotatable fingers for transferring a cane not gauged by one set to another set and means for discharging cane endwise from said machine.

18. In a gauging machine, a series of gauges of successively increasing sizes, a supporting plate parallel with said series and having rest notches aligned with said gauges, and means positioned between said series of gauges and said plate for moving an article not gauged by any of said gauges to another gauge.

19. In a gauging machine, two spaced parallel plates, one having notches in one end and the other having gauges comprising sets of gauge jaws in a plane passing through said notches, and means positioned between said plates for pushing articles resting in said notches and said gauges from such position to another gauge.

20. In a machine for gauging cane, means for supporting one portion of said cane, means for gauging another portion and for permitting said gauged portion to pass between the jaws and means for propelling said cane from said machine.

21. A cane-gauging device comprising means for supporting a portion of a cane, and means for permitting the gauged portion to move to a position below the supported portion to effect its rapid discharge.

22. In a machine for gauging cane, two spaced parallel plates, one of said plates having notches for receiving and supporting one portion of said cane and the other plate having a series of slots having gauge jaws for gauging another portion of said cane.

23. In a gauging machine for gauging cane, two spaced parallel plates, one of said plates having notches in its upper edge for receiving and supporting a portion of a cane and the other plate having a series of vertical slots having gauges comprising sets of gauge jaws positioned at the upper ends of said slots, whereby a cane passing through any gauge is permitted to drop into the slot underlying the same.

24. In a gauging machine for gauging cylindrical articles, two spaced parallel plates, one of said plates having notches for receiving and supporting a portion of an article, the other of said plates having gauges and vertical slots in alignment with said gauges, whereby a portion of said article passing through a gauge is permitted to fall into said slots and tilt the article to accelerate its discharge.

25. In a gauging machine for gauging cylindrical articles, two spaced plates, one of said plates being adapted for receiving and supporting a portion of an article, the other plate having gauges and vertical slots in alignment therewith, means for feeding articles whereby one portion thereof is supported upon one of said plates and the other portion applied to said gauges and means for adjusting said articles during the feeding operation to position them in a given relation to said plates.

26. In a rod gauging machine, the combination of a plurality of gauging members, means independent of said members for positioning rods to be gauged in one plane and means for discharging all gauged rods in a different plane and in the direction of their longitudinal axes.

27. In a gauging machine, the combination of means for feeding articles, a plurality of fixed gauging members in horizontal rectilinear arrangement, means independent of said members for applying articles thereto and means for discharging all gauged articles substantially at right angles to their movement during the feeding operation.

28. In a cane gauging machine a plurality of gauging jaws, straight portions between said jaws for the movement of cane from one jaw to another, means adjacent each of said jaws for engagement with a cane to lift the same and move the cane to another jaw and means associated with each pair of jaws to effect a rapid rotation of the cane as it enters said jaws.

29. In a cane gauging machine the combination with a plurality of sets of gauging jaws, inclined surfaces adjacent to each set of jaws, horizontal portions between said inclined surfaces and means for moving said articles along said horizontal surfaces and to position for movement down said inclined surfaces to effect a rotation of the articles prior to their application to the gauging jaws.

30. In a cane gauging machine, the combination with a plurality of sets of gauging jaws, an inclined guide disposed adjacent each set of jaws, horizontal surfaces between each set of jaws, rotary pusher-fingers adapted to move cane along said horizontal surfaces for movement down said inclined guide, whereby a rotation of the cane may be effected prior to and during their application to said jaws.

31. In a gauging machine having gauging jaws disposed in a horizontal plane, inclined surfaces, each pair of jaws, movable pusher fingers for tumbling articles down said inclined surfaces to said jaws whereby the articles are caused to present more than one point of their respective peripheries to said jaws.

32. In a gauging machine having a plurality of gauges comprising gauging jaws, inclined surfaces associated with each pair of jaws, rotary pusher fingers disposed in operative relation to said jaws for successively feeding articles to said inclined surfaces to permit said articles to move rapidly toward the gauging jaws, whereby various points on the periphery of the cane are applied to the gauges.

33. A gauging machine having an article-arranging means, comprising a downwardly inclined support having a horizontal section at its lower edge, a conveyor cooperating with said support for successively removing articles therefrom, notches in said conveyor to receive said articles and a second conveyor cooperating with said first conveyor for removing the articles carried in said notches, said conveyors being operated in a predetermined timed relation.

34. A gauging machine having an article-arranging means, comprising a downwardly inclined support having a horizontal section at its lower edge, a conveyor cooperating with said support for successively removing articles therefrom, said conveyor having connecting links with notches in their outer edges for receiving said articles and a second conveyor cooperating with said first conveyor for removing the articles carried in said notches, said conveyors being operated in a predetermined timed relation.

35. A gauging machine having article-arranging means, comprising a downwardly inclined support having a horizontal section at its lower edge, a conveyor cooperating with said support for successively removing articles therefrom, notched links in said conveyor for effecting such operation, a second conveyor cooperating with said first mentioned conveyor for removing the articles carried in said notches, said links cooperating with said second mentioned conveyor to obviate breakage of said articles during passage from one conveyor to the other, and means for operating said conveyors in a predetermined timed relation.

36. A gauging machine, comprising a downwardly inclined support, a conveyor in alignment with the lower end of said support for receiving articles therefrom, a second conveyor adjacent the opposite end of said first conveyor for receiving articles transported by said first conveyor from said support, a series of gauges into which said second conveyor deposits said articles, a discharging conveyor for removing articles passing through said gauges, and containers for receiving the discharged articles.

37. A gauging machine, comprising a support for feeding articles downwardly, a conveyor in alignment with said support for receiving said articles therefrom, a series of gauges for receiving articles transported by said conveyor, a series of pusher fingers for progressively moving said articles from one gauge to another, a discharging conveyor for removing the articles passing through said gauges, and containers for receiving the discharged articles.

38. A gauging device, comprising a support for feeding a cane downwardly, a conveyor for receiving and advancing said cane, a series of gauges for gauging a portion of said cane, as they are fed thereto by said conveyor, a plate for supporting another portion of said cane while being gauged, a conveyor for discharging the cane passing through said gauges and a series of pushers for transferring the can progressively through said series of gauges.

39. A gauging machine comprising a plurality of downwardly inclined supports, a plurality of sprocket chains in line with the the lower ends of said supports and extending horizontally therefrom in parallelism, a plurality of conveying disks having teeth thereon, said disks overlapping said sprocket chains, a series of gauges comprising sets of gauge jaws in alignment with one of said sprocket chains, a supporting plate in alignment with another of said sprocket chains and parallel to said gauges, said supporting plate having notches corresponding to said sets of gauge jaws, a high-speed discharging roller parallel to and beneath said gauges, and receiving containers adjacent said high-speed roller.

40. A cane-gauging machine comprising a plurality of downwardly inclined supports, a plurality of chain conveyors in line with the lower ends of said supports and extending horizontally therefrom in parallelism, a plurality of disks overlapping said chain conveyors and having teeth thereon, a plurality of gauges of different sizes in alignment with one of said chain conveyors, a supporting plate parallel with said gauges and in alignment with another of said chain conveyors, notches in said supporting plate corresponding to said gauges, a plurality of pushers adjacent said gauges and notches, a high-speed discharging roller parallel to and beneath said gauges, and containers adjacent said roller.

In testimony whereof, we have hereunto subscribed our names this 29 day of April, 1921.

JAMES BRYANT WHITMORE.
JOHN EBLING FERGUSON.